United States Patent
Zhu

(10) Patent No.: US 10,929,422 B2
(45) Date of Patent: Feb. 23, 2021

(54) METHOD, DEVICE, AND NON-TRANSITORY COMPUTER-READABLE STORAGE MEDIUM FOR VISUALLY EXPRESSING LIKELIHOOD OF OCCURRENCE OF LIFE EVENTS

(71) Applicant: FUJITSU LIMITED, Kanagawa (JP)

(72) Inventor: Wei Zhu, Edogawa (JP)

(73) Assignee: FUJITSU LIMITED, Kawasaki (JP)

(*) Notice: Subject to any disclaimer, the term of this patent is extended or adjusted under 35 U.S.C. 154(b) by 290 days.

(21) Appl. No.: 15/886,388

(22) Filed: Feb. 1, 2018

(65) Prior Publication Data

US 2018/0253480 A1   Sep. 6, 2018

(30) Foreign Application Priority Data

Mar. 2, 2017   (JP) .............................. JP2017-039544

(51) Int. Cl.
| | |
|---|---|
| *G06F 16/20* | (2019.01) |
| *G06F 16/26* | (2019.01) |
| *G06F 3/0485* | (2013.01) |
| *G06F 16/335* | (2019.01) |
| *G06F 40/20* | (2020.01) |
| *G06F 40/279* | (2020.01) |

(52) U.S. Cl.
CPC .......... *G06F 16/26* (2019.01); *G06F 3/04855* (2013.01); *G06F 16/335* (2019.01); *G06F 40/20* (2020.01); *G06F 40/279* (2020.01)

(58) Field of Classification Search
CPC ...... G06F 16/26; G06F 16/335; G06F 40/279; G06F 40/20; G06F 3/04855
See application file for complete search history.

(56) References Cited

U.S. PATENT DOCUMENTS

| | | | |
|---|---|---|---|
| 9,721,229 B1* | 8/2017 | Hernandez ............. | G06Q 50/01 |
| 2007/0129893 A1* | 6/2007 | McColl .................. | G06Q 10/00 |
| | | | 702/19 |
| 2008/0294663 A1* | 11/2008 | Heinley ................. | G06F 3/0481 |
| 2009/0176509 A1* | 7/2009 | Davis .................... | H04W 4/185 |
| | | | 455/456.3 |
| 2010/0063907 A1* | 3/2010 | Savani .................. | G06Q 40/12 |
| | | | 705/30 |

(Continued)

FOREIGN PATENT DOCUMENTS

JP   2003-115951   4/2003

*Primary Examiner* — Tarek Chbouki

(74) *Attorney, Agent, or Firm* — Fujitsu Patent Center

(57) ABSTRACT

A method, performed by a computer, for event estimation, the method includes: executing a registering process that includes receiving a registration of a first word group including a plurality of words, each of which is associated with time, and storing the first word group into a memory; executing a calculating process that includes receiving a first time pointer that indicates a time point on a time axis, obtaining, among the plurality of words in the first word group, a first word associated with a time belonging to a predetermined range from the time point indicated by the first time pointer, and calculating, in accordance with the first word, an index value indicating likelihood of occurrence of a life event; and executing a display process that includes controlling display of the life event based on the index value.

10 Claims, 15 Drawing Sheets

(56) References Cited

U.S. PATENT DOCUMENTS

| | | | | |
|---|---|---|---|---|
| 2014/0046723 A1* | 2/2014 | Clark | ............... | G06Q 40/08 |
| | | | | 705/7.29 |
| 2015/0088739 A1* | 3/2015 | Desai | ............... | G06O 20/322 |
| | | | | 705/42 |
| 2015/0161529 A1* | 6/2015 | Kondaji | ............... | G06Q 10/063 |
| | | | | 705/7.11 |
| 2015/0206248 A1* | 7/2015 | Kornweibel | ............... | G06Q 40/08 |
| | | | | 705/4 |
| 2016/0014176 A1* | 1/2016 | Ariav | ............... | H04W 4/023 |
| | | | | 709/219 |
| 2016/0364809 A1* | 12/2016 | Kamura | ............... | G06F 30/20 |

* cited by examiner

FIG. 5

| LIFE EVENT TREND | PERIOD | | | |
|---|---|---|---|---|
| | 2010 | 2015 | 2020 | ... |
| AVERAGE MARRIAGE AGE (MALE) | 30.5 YEARS OLD | 31.1 YEARS OLD | ... | ... |
| AVERAGE MARRIAGE AGE (FEMALE) | 28.8 YEARS OLD | 29.4 YEARS OLD | ... | ... |
| AVERAGE CHILDBEARING AGE | 29.9 YEARS OLD | 30.7 YEARS OLD | ... | ... |
| AVERAGE NURSING CARE NEEDING AGE | 75 YEARS OLD | 75 YEARS OLD | ... | ... |
| ... | ... | ... | ... | ... |

FIG. 6

| CUSTOMER ID | CUSTOMER WORD ID | REGISTERED WORD OF CUSTOMER | TIME SERIES ID | WORD TYPE |
|---|---|---|---|---|
| 0002 | 001 | WORD 1 | 100 | INTEREST KEYWORD |
| 0002 | 002 | WORD 2 | 300 | INTEREST KEYWORD |
| 0002 | 003 | WORD 3 | 500 | PROFILE INFORMATION |
| 0002 | 004 | WORD 4 | 550 | PROFILE INFORMATION |
| ... | ... | ... | ... | ... |

FIG. 7

| CUSTOMER ID | CUSTOMER NAME | LIFE EVENT | ESTIMATED VALUE (5 YEARS AGO) | ESTIMATED VALUE (PRESENT) | ESTIMATED VALUE (5 YEARS HENCE) | ESTIMATED VALUE (10 YEARS HENCE) |
|---|---|---|---|---|---|---|
| 0002 | CUSTOMER B | MARRIAGE | 80% | 0% | 0% | 0% |
| 0002 | CUSTOMER B | CHILDBIRTH | 5% | 78% | 36% | 12% |
| 0002 | CUSTOMER B | CHILD REARING | 2% | 61% | 95% | 45% |
| 0002 | CUSTOMER B | HOUSING | 10% | 14% | 56% | 75% |
| 0002 | CUSTOMER B | UNIVERSITY | 0% | 0% | 1% | 32% |
| 0002 | CUSTOMER B | NURSING CARE | 0% | 1% | 2% | 24% |
| ... | ... | ... | ... | ... | ... | ... | ns
METHOD, DEVICE, AND NON-TRANSITORY COMPUTER-READABLE STORAGE MEDIUM FOR VISUALLY EXPRESSING LIKELIHOOD OF OCCURRENCE OF LIFE EVENTS

CROSS-REFERENCE TO RELATED APPLICATION

This application is based upon and claims the benefit of priority of the prior International Patent Application No. 2017-039544, filed on Mar. 2, 2017, the entire contents of which are incorporated herein by reference.

FIELD

The embodiments discussed herein are related to a method, a device, and a non-transitory computer-readable storage medium for visually expressing likelihood of occurrence of life events.

BACKGROUND

Life events such as getting employed, a marriage, a childbirth, child rearing, nursing care, and inheritance happen to people. A salesperson such as an insurance agent builds a trusted relationship with a customer by having small talk or a chat including topics related to life events before having a business talk with the customer.

In addition, the salesperson uses various information technologies to obtain information about topics to be provided to the customer. As such an information technology, a topic information providing system, for example, is proposed which provides topic information suitable for preferences to each caller during a call.

Examples of the related art include Japanese Laid-open Patent Publication No. 2003-115951.

SUMMARY

According to an aspect of the embodiments, a method, performed by a computer, for event estimation, the method includes: executing a registering process that includes receiving a registration of a first word group including a plurality of words, each of which is associated with time, and storing the first word group into a memory; executing a calculating process that includes receiving a first time pointer that indicates a time point on a time axis, obtaining, among the plurality of words in the first word group, a first word associated with a time belonging to a predetermined range from the time point indicated by the first time pointer, and calculating, in accordance with the first word, an index value indicating likelihood of occurrence of a life event; and executing a display process that includes controlling display of the life event based on the index value.

The object and advantages of the invention will be realized and attained by mean of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data configuration of a trend information DB;

FIG. 6 is a diagram illustrating an example of a data configuration of a word information file;

FIG. 7 is a diagram illustrating an example of estimated values with regard to likelihood of occurrence of life events;

DESCRIPTION OF EMBODIMENTS

In the related art mentioned above, it is difficult to grasp the likelihood of occurrence of life events visually. A customer having a newborn child, for example, may be considered to have high interest in child rearing at present. However, the high interest which the customer has may be changed from child rearing to nursing care when the customer's parents grow old in the future. In consequence, it is difficult for the related art to provide topic information appropriate for the customer even when the high interest which the customer has changes due to the occurrence of a life event. For example, a user who utilizes the conventional system may be forced to repeat frequent access to the system to find a topic actually matching the interest of the customer, and then hardware resources of the system are unnecessarily wasted.

According to an aspect of the present disclosure, provided are technologies for visually expressing the likelihood of occurrence of life events.

Embodiments of an estimating program, an estimating method, and an estimating device disclosed in the present application will hereinafter be described in detail with reference to the drawings. It is to be noted that the present embodiments do not limit the disclosed technology. In addition, the following embodiments may be combined with each other as appropriate within a scope where no inconsistency arises.

First Embodiment

Example of System Configuration

Figure 1:
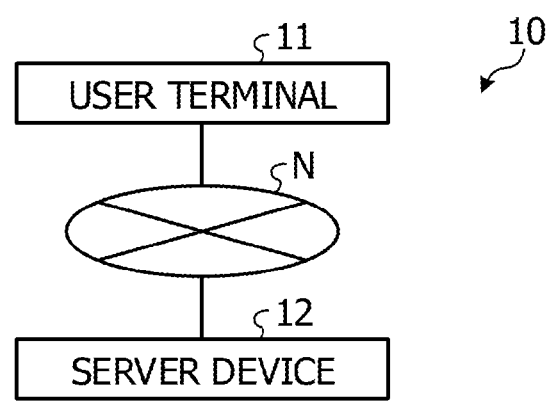
FIG. 1 is a diagram illustrating an example of a configuration of an estimating system according to a first embodiment.

FIG. 1 is a diagram illustrating an example of a configuration of an estimating system according to a first embodiment. As illustrated in FIG. 1, the estimating system 10 includes a user terminal 11 and a server device 12. In the present embodiment, the server device 12 is an example of an estimating device.

The estimating system 10 is a system that visually expresses the likelihood of occurrence of life events. In the present embodiment, description will be made by taking as an example a case where a salesperson such as an insurance agent as a user uses the estimating system 10 in order to grasp the likelihood of occurrence of life events of a customer visually.

The user terminal 11 and the server device 12 are communicatably coupled to each other via a network N. An arbitrary kind of communication network may be employed as such a network N, the arbitrary kind of communication network being a local area network (LAN), a virtual private network (VPN), a mobile communication network, or the like in addition to the Internet irrespective of whether the network is a wired network or a radio network.

The user terminal 11 is an example of a terminal device carried by a salesperson as a user. For example, a portable terminal device such as a smart phone or a tablet terminal may be used as the user terminal 11. The salesperson accesses the server device 12 using the user terminal 11, and makes profile information of a customer and the like displayed on the user terminal 11. At this time, the salesperson may visually grasp the likelihood of occurrence of life events of the customer by viewing the profile information and the like displayed on the user terminal 11.

The server device 12 is an example of an information processing device that provides the user with estimating service that visually expresses the likelihood of occurrence of life events. For example, the server device 12 calculates estimated values (may be referred to as "index values") with regard to the likelihood of occurrence of life events (for example, a marriage and a childbirth) based on words (for example, an age and an interest keyword) associated with a time belonging to a predetermined range from a time point (e.g. the present time, the past, or the future) specified from the user terminal 11. The server device 12 controls display of the life events on the user terminal 11 based on the calculated estimated values. Incidentally, only one information processing device may be used or a plurality of information processing devices may be used as the server device 12. In addition, a cloud computing technology such as software as a service (SaaS) or platform as a service (PaaS) may be applied to the server device 12. Incidentally, in the present embodiment, description will be made of an example of a case where the estimating service is provided by one server device 12.

Server Device

Figure 2:
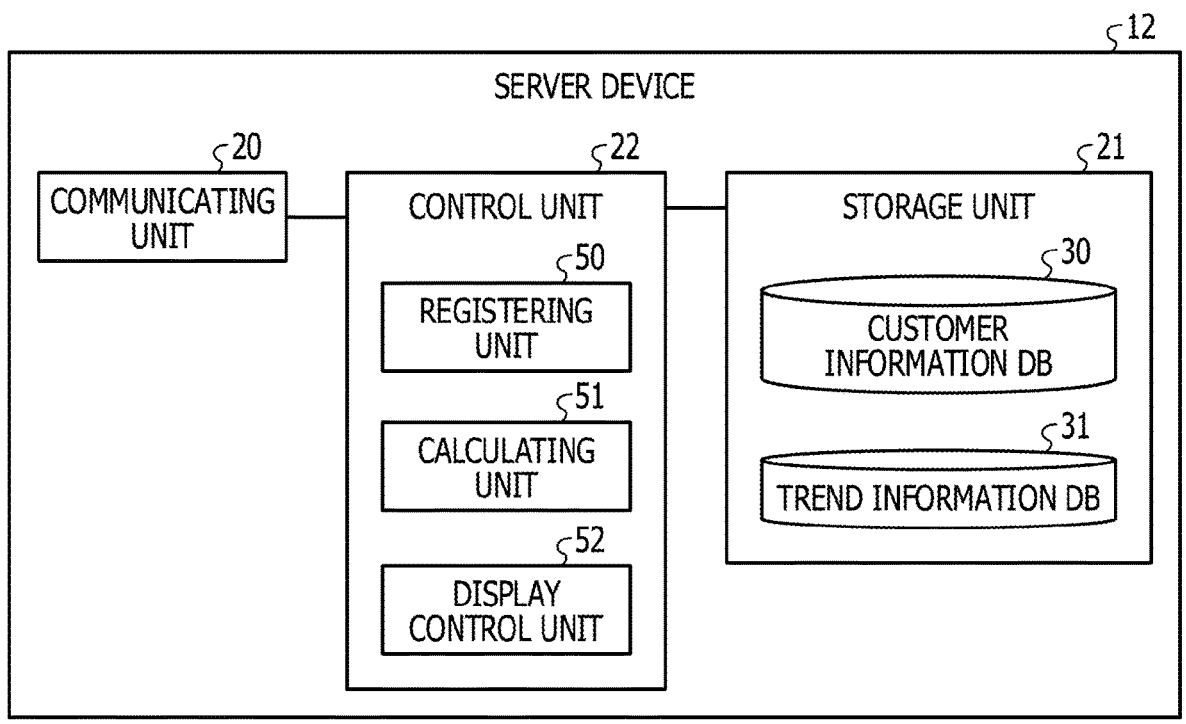
FIG. 2 is a diagram illustrating an example of a configuration of a server device.

A configuration of a server device will next be described with reference to FIG. 2. FIG. 2 is a diagram illustrating an example of a configuration of a server device. The server device depicted in FIG. 2 may be the server device 12 depicted in FIG. 1. As illustrated in FIG. 2, the server device 12 includes a communicating unit 20, a storage unit 21, and a control unit 22. Incidentally, the server device 12 may include various kinds of functional units included in a known computer, for example, functional units such as various kinds of input devices and an audio output device, in addition to the functional units illustrated in FIG. 2.

The communicating unit 20 is, for example, implemented by a network interface card (NIC). The communicating unit 20 is a communication interface that is coupled to the user terminal 11 by wire or radio via the network N, and which controls communication of information with the user terminal 11.

The storage unit 21 is, for example, implemented by a semiconductor memory element such as a random access memory (RAM) or a flash memory, and a storage device such as a hard disk or an optical disk. The storage unit 21 includes a customer information database 30 and a trend information database 31. The storage unit 21 also stores information used for processing in the control unit 22. Incidentally, in the following description, a database may be denoted as a DB.

Figure 3:
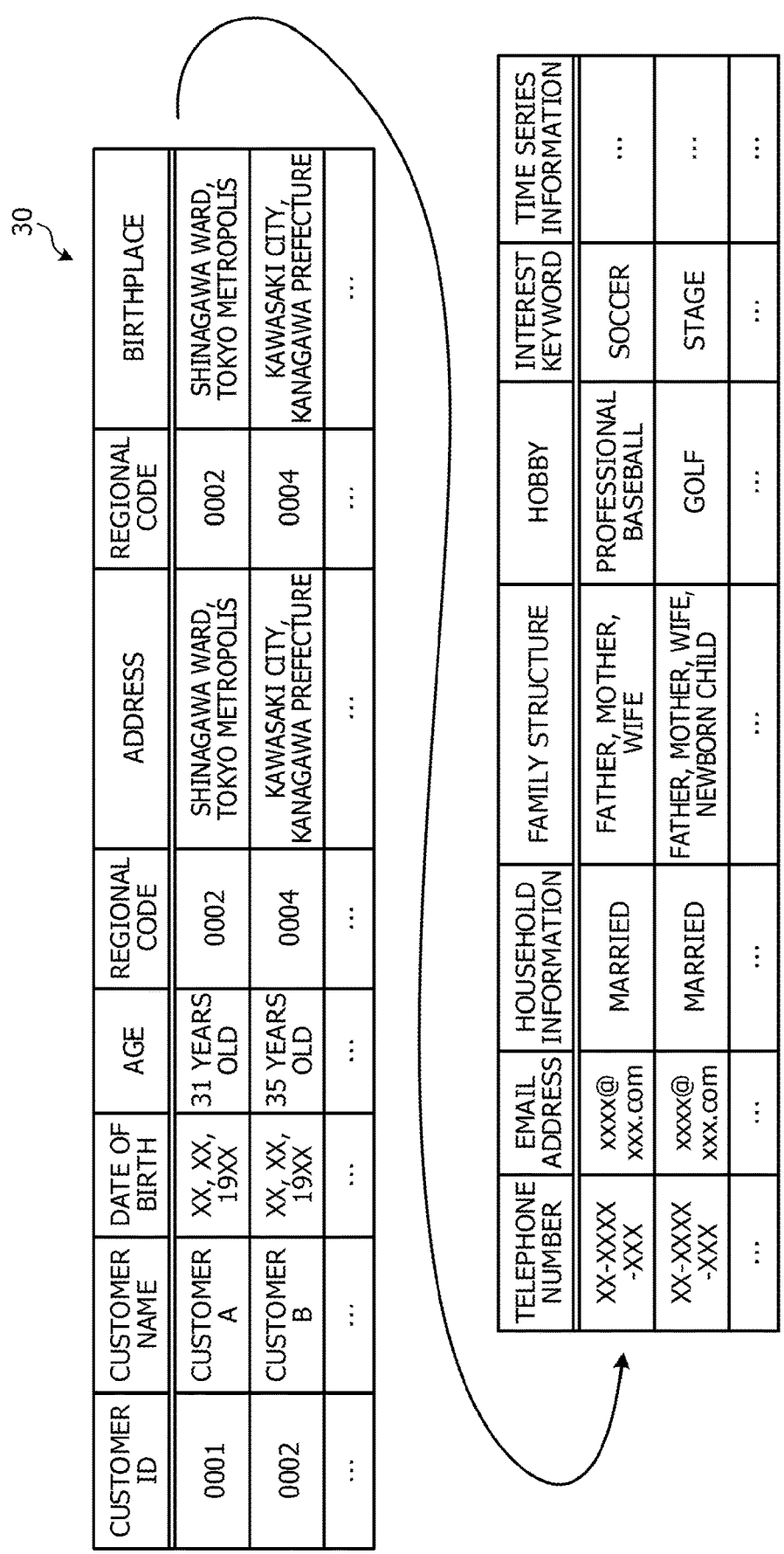
FIG. 3 is a diagram illustrating an example of a data configuration of a customer information database (DB)

The customer information DB 30 stores information obtained by associating customer profile information, interest keywords, and the like with time. FIG. 3 is a diagram illustrating an example of a data configuration of the customer information DB. As illustrated in FIG. 3, the customer information DB 30 includes items such as a customer identifier (ID), a customer name, a date of birth, an age, a regional code (address), an address, a regional code (birthplace), a birthplace, a telephone number, an email address, household information, a family structure, a hobby, and time series information. The customer information DB 30, for example, stores one record for each customer ID.

The customer ID is an identifier uniquely identifying a customer. The customer name is information representing the name of the customer. The regional code (address) is an identifier that identifies a region corresponding to an address. The address is information representing the present address of the customer. The regional code (birthplace) is an identifier that identifies a region corresponding to a birthplace. The birthplace is information representing the birthplace of the customer. The telephone number is information representing a telephone number as contact information of the customer. The email address is information representing an email address as contact information of the customer. The household information is information distinguishing whether the customer is unmarried or married. The family structure is information representing the family structure of the customer. The hobby is information representing the hobby of the customer. The time series information is information obtained by arranging, in time series, customer profile information and information about interest keywords associated with times.

Figure 4:
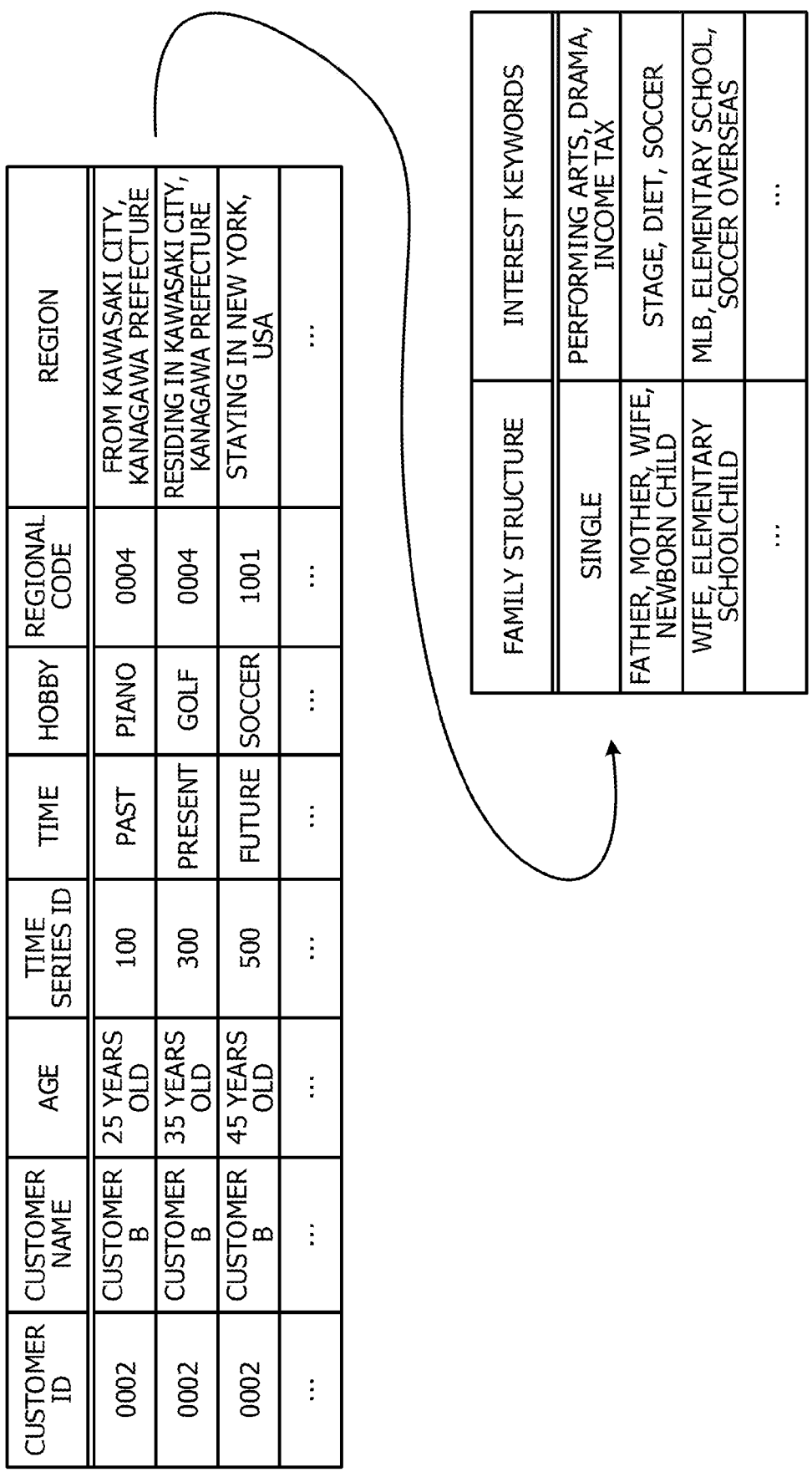
FIG. 4 is a diagram illustrating an example of a data configuration of time series information.

Details of the time series information will be described in the following with reference to FIG. 4. FIG. 4 is a diagram illustrating an example of a data configuration of the time series information. As illustrated in FIG. 4, the time series information includes profile information and information about interest keywords in the past, present, and future of the customer. The time series information includes items such as a customer ID, a customer name, an age, a time series ID, a time, a hobby, a regional code, a region, a family structure, and interest keywords.

The customer ID is an identifier uniquely identifying a customer. Incidentally, here, the customer ID of a customer B is cited as an example of the customer ID. The customer name is information representing the name of the customer corresponding to the customer ID. The age is information representing the age of the customer at a time corresponding to the time series ID. The time series ID is an identifier identifying a "time" such as the past, the present or the future associated with the profile information of the customer. The time is information representing a time corresponding to the time series ID. The hobby is information representing the hobby of the customer, the information corresponding to the time indicated by the time series ID. The regional code is an identifier uniquely identifying a region. The region is information representing the region of the residence of the customer, the information corresponding to the time indicated by the time series ID. The family structure is information representing the family structure of the customer, the information corresponding to the time indicated by the time series ID. The interest keywords are information representing keywords in which the customer is interested, the information corresponding to the time indicated by the time series ID. It is to be noted that each item of the time series information illustrated in FIG. 4 is an example, and that the time series information may include other items. In addition, each item of the customer information DB 30 illustrated in FIG. 3 is an example, and the customer information DB 30 may include other items.

The description returns to FIG. 2. The trend information DB 31 stores various kinds of information about trends of society such as an average age of marriage and an average childbearing age. FIG. 5 is a diagram illustrating an example of a data configuration of the trend information DB. As illustrated in FIG. 5, the trend information DB 31 includes items such as life event trends and periods. In addition, the periods include items such as 2010, 2015, and 2020.

The life event trends, for example, include an average marriage age, an average childbearing age, and an average nursing care needing age. As for a column of each period, a column of 2010, for example, has statistical numerical values of 2010 with regard to the respective life event trends. Similarly, a column of 2015 has statistical numerical values of 2015 with regard to the respective life event trends. In addition, the same is true for a column of 2020 and subsequent columns. It is to be noted that each item of the trend information DB 31 illustrated in FIG. 5 is an example, and that the trend information DB 31 may include other items.

The description returns to FIG. 2. The control unit 22 controls the server device 12. The control unit 22 is, for example, implemented by a central processing unit (CPU) or a micro processing unit (MPU) by executing a program stored in an internal storage device with a RAM as a processing area. In addition, the control unit 22 may, for example, be implemented by an integrated circuit such as an application specific integrated circuit (ASIC) or a field programmable gate array (FPGA).

The control unit 22 includes an internal memory for storing programs defining various processing procedures and control data, and performs various processing based on the programs and the control data. The control unit 22 functions as various kinds of processing units when the various programs operate. The control unit 22 includes a registering unit 50, a calculating unit 51, and a display control unit 52, and implements or performs information processing functions and actions to be described in the following. It is to be noted that an internal configuration of the control unit 22 is not limited to the configuration illustrated in FIG. 2, and may be another configuration as long as the configuration performs information processing to be described later.

The registering unit 50 receives keyword registrations, input of various kinds of information, and the like, and stores the received information and the like in various corresponding DBs or various corresponding files of the storage unit 21. The calculating unit 51 obtains data from the various DBs, the various files, or the like, and calculates numerical values or the like to be used in processing based on the obtained data. The display control unit 52 controls display of various kinds of information.

When the registering unit 50 is accessed by the user terminal 11, the registering unit 50 outputs, to the display control unit 52, instructions to transmit information of various kinds of operating screens to the user terminal 11 as an access source, and make the operating screens displayed on the user terminal 11 as the access source. For example, the registering unit 50 accepts a login of the user by receiving input of a user ID on a login screen displayed on the user terminal 11. In addition, when the registering unit 50 accepts the login, the registering unit 50 outputs, for example, an instruction to display a customer selecting screen to the display control unit 52.

Each functional unit will be described in the following by taking as an example a case where a "user A" logs in and selects a "customer B" whose customer ID is "0002" on the customer selecting screen.

The registering unit 50 receives a registration of a first word group associated with time, and stores the first word group in a processing area of the storage unit 21. For example, the registering unit 50 refers to the customer information DB 30 for the customer B, receives a plurality of interest keywords and profile information (words representing a profile) associated with time (provided with time), and registers the plurality of interest keywords and the profile information as a registered word group (first word group) of the customer B in the processing area of the storage unit 21. At this time, the registering unit 50 generates a word information file as the registered word group of the customer B, and stores the word information file in the processing area of the storage unit 21.

The word information file will be described in the following with reference to FIG. 6. FIG. 6 is a diagram illustrating an example of a data configuration of the word information file. As illustrated in FIG. 6, the word information file stores information about the registered word group of the customer. The word information file includes items such as a customer ID, a customer word ID, a registered word of the customer, a time series ID, and a word type.

The customer ID is an identifier uniquely identifying the customer. Incidentally, the example of FIG. 6 represents a case where the customer ID is the customer ID of the customer B. The customer word ID is an identifier uniquely identifying a registered word of the customer. The registered word of the customer is information representing a word included in the registered word group of the customer. The time series ID is information identifying a "time" such as the past, the present or the future associated with the registered word of the customer. The word type is information distinguishing whether the registered word of the customer is an interest keyword or a word extracted from the profile information. Interest keywords, for example, include "drama," "diet," and "performing arts." Words extracted from the profile information, for example, include "male," "Kawasaki city," and "35 years old." It is to be noted that each item of the word information file illustrated in FIG. 6 is an example, and that the word information file may include other items.

The description returns to FIG. 2. The calculating unit 51 may obtain a time pointer which indicates a time point on a time axis and is generated in response to the user's operation, and then the calculating unit 51 may obtain, among the plurality of words in the first word group, words (may be referred to as "first word") associated with a time belonging to a predetermined range from the time point indicated by the time pointer. The calculating unit 51 may calculate, in accordance with the first word, an estimated value (may be referred to as "index value") or estimated values (may be referred to as "index values") indicating the likelihood of occurrence of one or a plurality of life events.

Description will next be made of a method of calculating estimated values with regard to the likelihood of occurrence of life events. The calculating unit 51, for example, refers to the trend information DB illustrated in FIG. 5 and the word information file illustrated in FIG. 6, and calculates estimated values with regard to the likelihood of occurrence of life events based on the registered word group of the customer B which registered word group is associated with the time in the vicinity of the specified time. First, the calculating unit 51 refers to the word information file illustrated in FIG. 6, and obtains words representing the age and the family structure of the customer from the registered word group of the customer B. Next, the calculating unit 51 refers to the trend information DB illustrated in FIG. 5, and obtains a numerical value corresponding to the specified time for the trend of each life event. From the words representing the age and the family structure of the customer and the numerical value of the trend of each life event, the calculating unit 51 calculates an estimated value with regard to the likelihood of occurrence of the life event by a given calculating method. When the interest keywords include an interest keyword corresponding to a life event, the calculating unit 51 may calculate the estimated value of the life event by correcting the estimated value of the life event to a higher value.

The estimated value will be described in the following with reference to FIG. 7. FIG. 7 is a diagram illustrating an example of estimated values with regard to the likelihood of occurrence of life events. Incidentally, suppose that the "present" is specified as a time in FIG. 7. In addition, estimated values with regard to the likelihood of occurrence of, for example, a marriage, a childbirth, child rearing, housing, a university, and nursing care as life events are expressed in percentages. As illustrated in FIG. 7, for each life event, the calculating unit 51, for example, calculates an estimated value such that the estimated value approaches 100% as timing of occurrence of the life event draws near. The calculating unit 51, for example, calculates an estimated value with regard to the likelihood of occurrence of each life event for the "present" as the specified time, five years ago (past), five years hence (future), and ten years hence (future) each. It is to be noted that each item of the estimated values with regard to the likelihood of occurrence of the life events illustrated in FIG. 7 is an example, and that other items may be included. In addition, each of the above-described life events is an example, and life events are not limited to these life events.

Each example of the life events will be described. As for a marriage, when the customer is a married person (for example, when "word: married person" is registered in association with "time: present"), the calculating unit 51 calculates 0% as an estimated value. In addition, when the customer is an unmarried person (when, for example, "word: unmarried person" is registered in association with "time: present"), the calculating unit 51 calculates an estimated value such that the closer to the average marriage age the age of the customer, the higher the estimated value, and such that the estimated value is decreased according to the age of the customer after the average marriage age. However, the calculating unit 51 calculates the estimated value to be a higher value by correcting the estimated value in a case of a customer personally having high interest in a marriage (for example, in a case where "word: marriage" is registered in association with "time: present") even when the customer is an unmarried person and greatly exceeds the average marriage age.

In addition, as for a childbirth, the calculating unit 51 calculates an estimated value to be a lower value when the customer is an unmarried person, and in a case of a married person, the calculating unit 51 calculates the estimated value such that the closer to the average childbearing age the age of the person in question or a spouse, the higher the estimated value, and such that the estimated value is decreased according to the age of the person in question or the spouse after the average childbearing age. However, the calculating unit 51 calculates the estimated value to be 0% in a case of a married couple not desiring any child (for example, in a case where "word: Dinks (no children)" is registered in association with "time: present") even when the customer is a married person and the age of the person in question or the spouse is of the average childbearing age or under. In addition, the calculating unit 51 calculates the estimated value to be a higher value by correcting the estimated value in a case of a married couple strongly desiring a child (for example, in a case where "word: child" is registered in association with "time: present") even when the age of the customer himself/herself or the spouse greatly exceeds the average childbearing age.

In addition, as for child rearing, the calculating unit 51 calculates an estimated value to be a very low value in a case of a customer having no children (for example, in a case where "word: Dinks (no children)" is registered in association with "time: present"). On the other hand, in a case of a customer having a child (for example, in a case where "word: child, five years old" is registered in association with "time: present"), the calculating unit 51 calculates an estimated value such that the lower the age of the child, the higher the estimated value, and such that the larger the number of children, the higher the estimated value.

In addition, as for housing, the calculating unit 51 calculates an estimated value to be a lower value when the customer owns a house (for example, when "word: owned house" is registered in association with "time: present"), and calculates the estimated value to be a higher value when the customer does not own any house.

In addition, as for a university, when the customer has no children, the calculating unit 51 calculates an estimated value to be a very low value, and when the customer has a child, the calculating unit 51 calculates the estimated value such that the estimated value is increased as the age of the child approaches a stage of university entrance examinations. However, in a case where the customer personally has high interest in universities for lifelong learning or the like (for example, in a case where "word: university" is registered in association with "time: present") even when the customer has no children, the calculating unit 51 calculates the estimated value to be a higher value by correcting the estimated value.

In addition, as for nursing care, the calculating unit 51 calculates an estimated value to be a very low value when the household of the customer does not include parents (for example, when "both parents: died" is registered in association with "time: present"). On the other hand, when the household of the customer includes a parent (for example, when "word: father, 75 years old" is registered in association with "time: present"), the calculating unit 51 calculates an estimated value such that the estimated value is increased as the age of the parent approaches the average nursing care needing age. When the customer has a parent who actually needs nursing care, the calculating unit 51 calculates the estimated value to be a highest value. In addition, the customer himself/herself or the spouse may be old even when the household of the customer does not include parents. In this case, the calculating unit 51 calculates the estimated value to be a higher value with regard to nursing care as the age of the customer himself/herself or the spouse approaches the average nursing care needing age, and calculates the estimated value to be a highest value when there is a family member who actually needs nursing care. It is to be noted that the above-described calculating method is an example, and that there is no limitation to this.

The description returns to FIG. 2. The display control unit 52 controls display of the one or plurality of life events based on the calculated estimated values. The display control unit 52, for example, generates screen data for displaying interest gages that associate the estimated values calculated as described above with the corresponding life events. The display control unit 52, for example, generates screen data for displaying interest gages that associate the estimated values with regard to the likelihood of occurrence of life events such as a marriage, a childbirth, child rearing, housing, a university, and nursing care with the respective life events. In addition, together with the display of the interest gages, the display control unit 52 may add display of a slide bar indicating time and display of interest keywords to the screen data.

The display control unit 52 adds, to the screen data, display of a word group corresponding to the specified time in the first word group stored in the storage unit 21. The display control unit 52, for example, makes a selection including a part or the whole of a word group corresponding to a time within a range of the time in the vicinity of the specified time from the registered word group of the customer B so that the part or the whole of the word group is displayed in time series corresponding to the past, the present, and the future.

Figure 8:
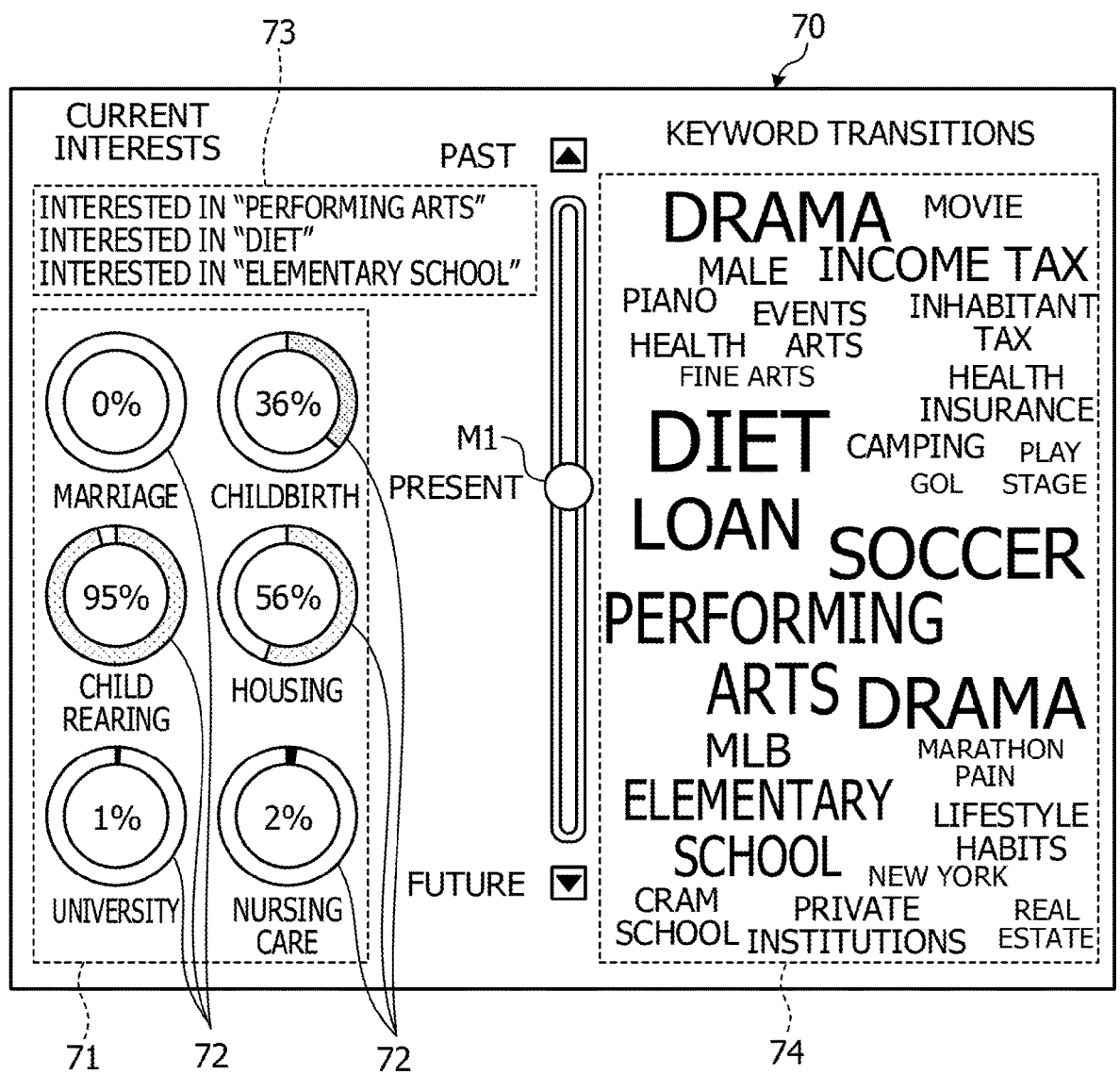
FIG. 8 is a diagram illustrating an example of a display screen that displays interest gages and keyword transitions.

The display control unit 52 transmits the screen data generated as described above to the user terminal 11 to display the interest gages with regard to the life events of the customer B and keyword transitions. FIG. 8 is a diagram illustrating an example of a display screen displaying interest gages and keyword transitions. As illustrated in FIG. 8, for example, a left-side region 71 on a display screen 70 displays, in percentages, interest gages 72 that associate estimated values corresponding to the time in the vicinity of the specified time with regard to the likelihood of occurrence of life events such as a marriage, a childbirth, child rearing, housing, a university, and nursing care with the respective life events. The interest gages 72 may, for example, be expressed by a circle graph for each life event.

In addition, the display control unit 52 may provide a region 73 above the region 71 of the interest gages, and display main interest keywords among the interest keywords of the customer B in the region 73. FIG. 8 represents an example of a case where "performing arts," "diet," and "elementary school" are displayed as main interest keywords in the region 73. In addition, the main interest keywords may be, for example, words having a high "degree of interest" as additional information of the keywords. Further, the interest keywords displayed in the region 73 may be, for example, interest keywords specified when the salesperson plans to visit the customer.

In addition, for example, a right-side region 74 on the display screen 70 displays, in time series, a word group extracted from the interest keywords and the profile information of the customer B. For example, the region 74 displays a word group extracted along the time series of the past, the present, and the future with the present as the specified time at a center. The region 74 displays profile information such as "male," "Kawasaki city," "35 years old," and "golf" along the time series together with interest keywords. Incidentally, FIG. 8 represents an example of a case where the present is specified.

Further, the display screen 70, for example, displays a slide bar M1 indicating time between the region 71 of the interest gages with regard to life events and the region 74 for the time series display of interest keywords. The slide bar M1 receives a specification of a time by the user. For example, the slide bar M1 is disposed in the vicinity of the region 74 to facilitate operating the time series display of interest keywords. When the calculating unit 51 receives a movement of the slide bar M1 by the user, the calculating unit 51 calculates estimated values so as to correspond to a time corresponding to the position of the slide bar M1 (incidentally, when the calculating unit 51 calculates present estimated values, the calculating unit 51 may also calculate past and future estimated values). The display control unit 52 generates screen data based on the calculated estimated values, selects a word group to be displayed in time series so as to correspond to the time corresponding to the position of the slide bar M1, and adds the word group to the screen data. The display control unit 52 transmits, to the user terminal 11, the screen data for displaying interest gages and keyword transitions to which screen data the selected word group is added, and moves the word group displayed within the display region according to the position of the slide bar M1 indicating time. Incidentally, words that go out of the display region due to the movement do not need to be displayed.

Figure 9:
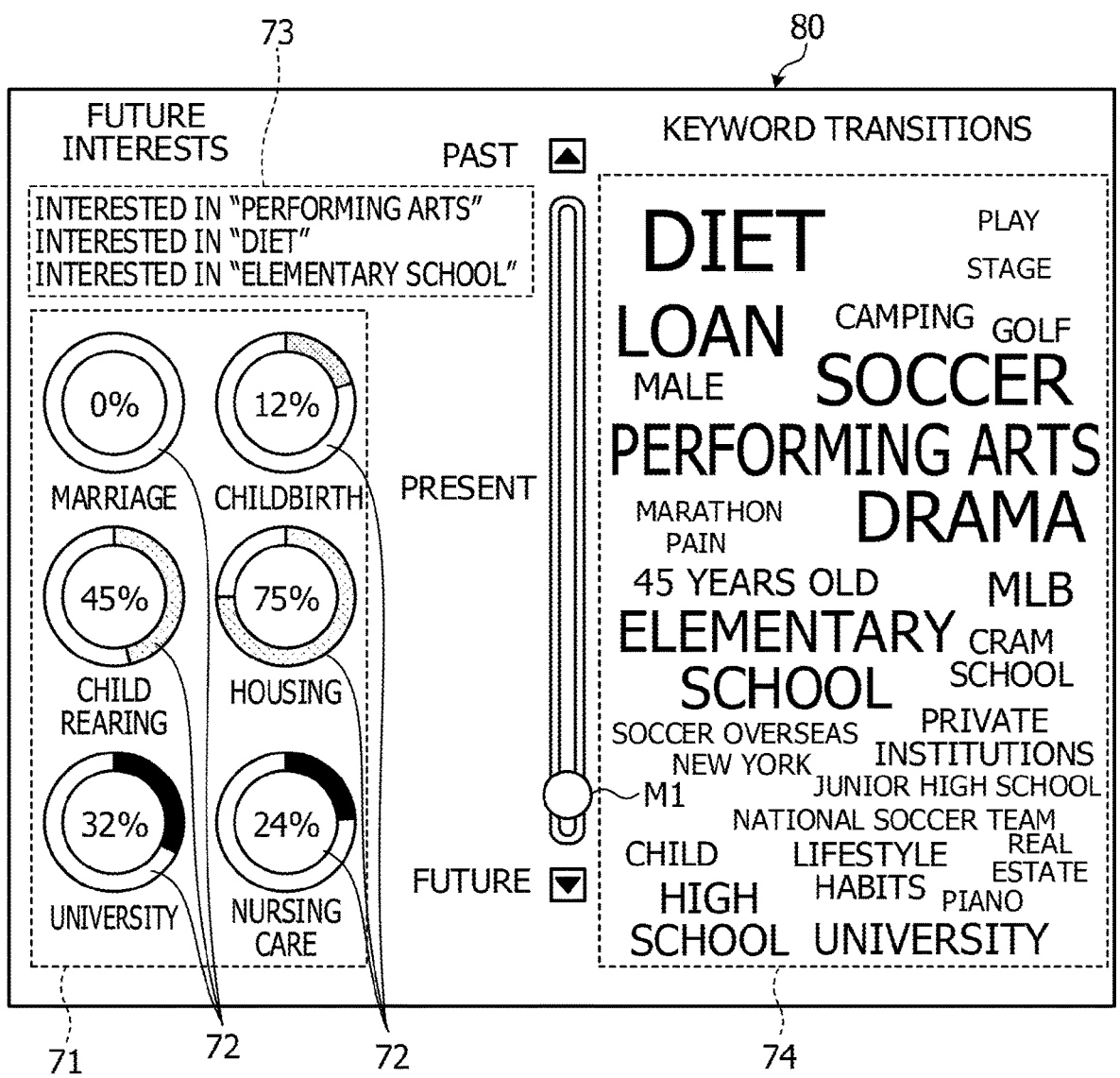
FIG. 9 is a diagram illustrating an example of a display screen that displays interest gages and keyword transitions corresponding to the future.

Description will next be made of a case where the position of the slide bar M1 indicating time is moved to a position corresponding to the future. FIG. 9 is a diagram illustrating an example of a display screen displaying interest gages and keyword transitions corresponding to the future. As illustrated in FIG. 9, as in the case of the display screen 70, displayed on a display screen 80 are, for example, a region 71 of interest gages, a region 73 of main interest keywords, a slide bar M1, and a region 74 of keyword transitions. The interest gages 72, the main interest keywords, the slide bar M1, and the keyword transitions displayed on the display screen 80 each correspond to the future.

In addition, the display control unit 52 may change the displayed interest keywords to a display mode corresponding to set weights. For example, the display control unit 52 may select a character size (font size) and a shade of color of each word according to a degree of interest in each word, and display each word.

Further, when an instruction to display the customer selecting screen is input from the registering unit 50, for example, the display control unit 52 transmits the screen data of the customer selecting screen to the user terminal 11 to display the screen data of the customer selecting screen according to the input instruction. In addition, the display control unit 52 transmits the screen data of various kinds of screens such as an operating screen to the user terminal 11 to display the screen data. The display control unit 52 may, for example, display the profile information of a customer that the user of an input user ID is in charge of on the user terminal 11.

Flow of Processing

Figure 10:
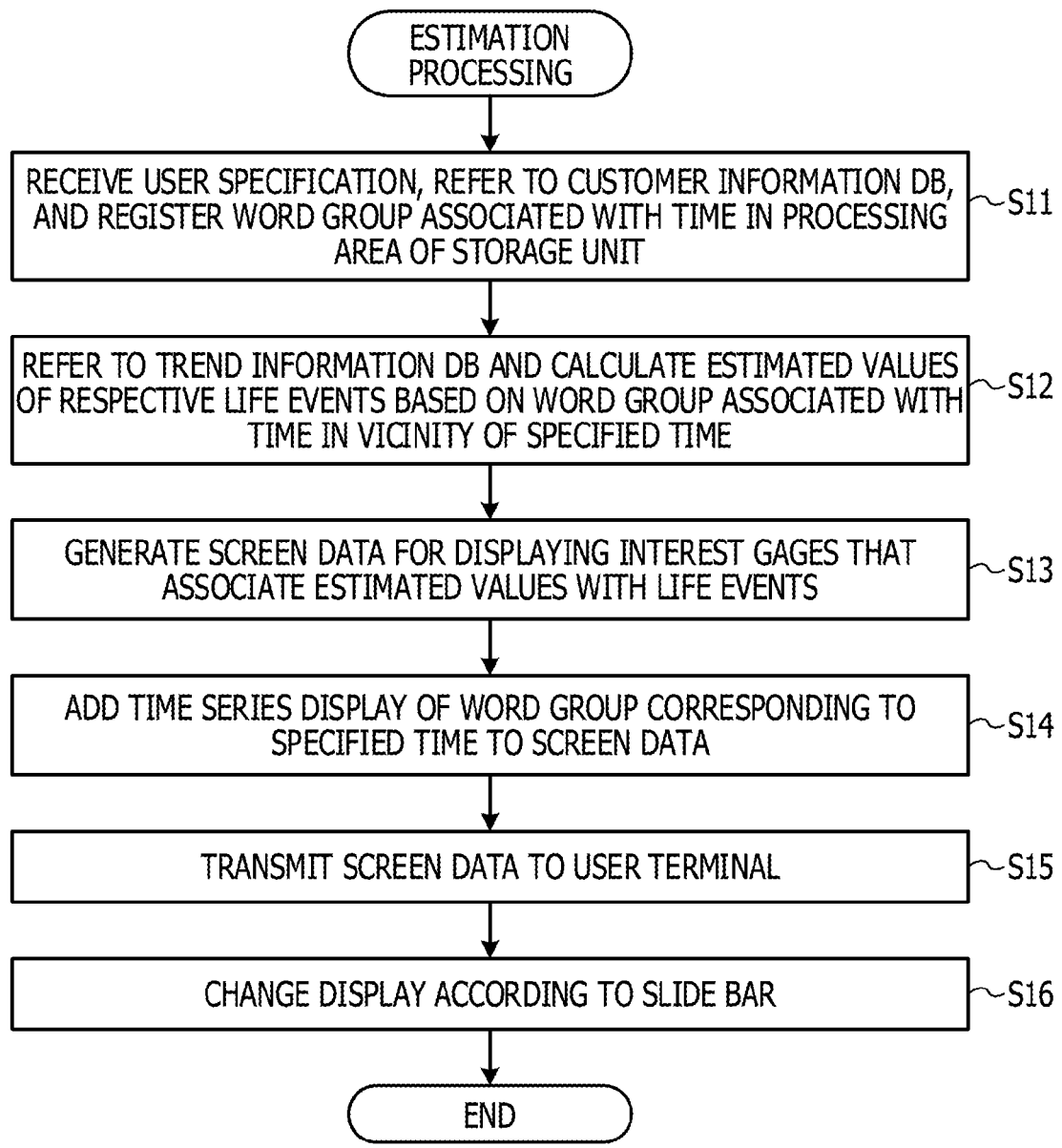
FIG. 10 is a flowchart illustrating an example of estimating processing according to the first embodiment.

Description will next be made of operation of the server device 12. FIG. 10 is a flowchart illustrating an example of estimating processing according to the first embodiment. The estimating processing, for example, the estimating processing of estimating the likelihood of occurrence of life events is started when a logged-in user selects a particular customer. The following description will be made of a case where, for example, the "user A" logs in and operates the user terminal 11, and selects the "customer B" whose customer ID is "0002."

First, the registering unit 50 of the server device 12 refers to the customer information DB 30 for the customer B, receives a plurality of keywords associated with time (provided with time), and registers the plurality of keywords as the registered word group (first word group) of the customer B in a processing area of the storage unit 21 (step S11).

Next, the calculating unit 51 refers to the storage unit 21 storing the registered first word group, and calculates an estimated value or estimated values with regard to the likelihood of occurrence of one or a plurality of life events based on words associated with a time in the vicinity of a specified time. For example, the calculating unit 51 refers to the word information file illustrated in FIG. 6, and calculates estimated values with regard to the likelihood of occurrence of life events based on the registered word group of the customer B which registered word group is associated with the time in the vicinity of the specified time (step S12).

Next, the display control unit 52 generates screen data for displaying interest gages that associate the calculated estimated values with the corresponding life events (step S13).

Next, the display control unit 52 adds, to the screen data, display of a word group corresponding to the specified time in the first word group stored in the storage unit 21 (step S14). The display control unit 52, for example, adds, to the screen data, time series display of a word group corresponding to a time within a range of the time in the vicinity of the specified time in the registered word group of the customer B. At this time, the display control unit 52 may update the screen data by selecting a character size corresponding to a degree of interest for each keyword to be displayed.

The display control unit 52 transmits the generated screen data to the user terminal 11 to display the interest gages with regard to the life events of the customer B and keyword transitions (step S15). As illustrated in FIG. 8, the display control unit 52, for example, displays, in the region 71, interest gages 72 that associate estimated values corresponding to the time in the vicinity of the specified time with regard to the likelihood of occurrence of the life events such as a marriage, a childbirth, child rearing, housing, a university, and nursing care with the respective life events. In addition, the display control unit 52, for example, displays, in the region 74, the word group in the time series of the past, the present, and the future with the present as the specified time at a center.

Here, when the registering unit 50 receives a movement of the slide bar M1 by the user, the display control unit 52 changes the display of the word group of the customer so as to correspond to a time indicated by the position of the slide bar M1 (step S16). The processing is then ended. The server device 12 may thereby visually express the likelihood of occurrence of life events.

Effect

Thus, the server device 12 receives a registration of the first word group associated with time. In addition, the server device 12 refers to the storage unit storing the registered first word group, and calculates an estimated value or estimated values with regard to the likelihood of occurrence of one or a plurality of life events based on words associated with a time in the vicinity of a specified time. In addition, the server device 12 may control display of the one or plurality of life events based on the calculated estimated value(s). As a result, the server device 12 may visually express the likelihood of occurrence of life events.

In addition, the server device 12 displays the calculated estimated value(s) in association with the corresponding life event(s). As a result, the server device 12 may visually express the likelihood of occurrence of life events in such a manner as to be easily understood by the user.

In addition, the server device 12 displays a word group corresponding to the specified time together with the display of the one or plurality of life events. As a result, the server device 12 may visually express the likelihood of occurrence of life events, and may visually express the word group corresponding to the specified time.

In addition, together with the display of the one or plurality of life events, the server device 12 makes display so as to include a part or the whole of a word group corresponding to a time within a range of the time in the vicinity of the specified time. As a result, the server device 12 may visually express the likelihood of occurrence of life events, and may select and visually express a main word group of the word group corresponding to the specified time.

In addition, the respective constituent elements of the illustrated parts do not necessarily need to be physically configured as illustrated in the figures. For example, concrete forms of distribution and integration of each part are not limited to those illustrated in the figures, and the whole or a part of each part may be configured so as to be distributed and integrated functionally or physically in arbitrary units according to various kinds of loads, usage conditions, or the like. For example, the registering unit 50 and the calculating unit 51 may be integrated with each other. In addition, each piece of the illustrated processing is not limited to the above-described order, and may be performed simultaneously or may be performed with the order interchanged within a scope where no inconsistency arises in processing contents.

Further, the whole or an arbitrary part of various kinds of processing functions performed in the respective devices may be performed on a CPU (or a microcomputer such as an MPU or a micro controller unit (MCU)). In addition, the whole or an arbitrary part of the various kinds of processing functions may be performed on a program analyzed and executed by a CPU (or a microcomputer such as an MPU or an MCU) or on hardware based on wired logic.

Second Embodiment

An embodiment of the disclosed device has been described thus far. However, the disclosed technology may be carried out in various different forms other than the foregoing embodiment. Accordingly, the following description will be made of another embodiment included in the present technology.

Example of Displaying Only Interest Gages

Figure 11:
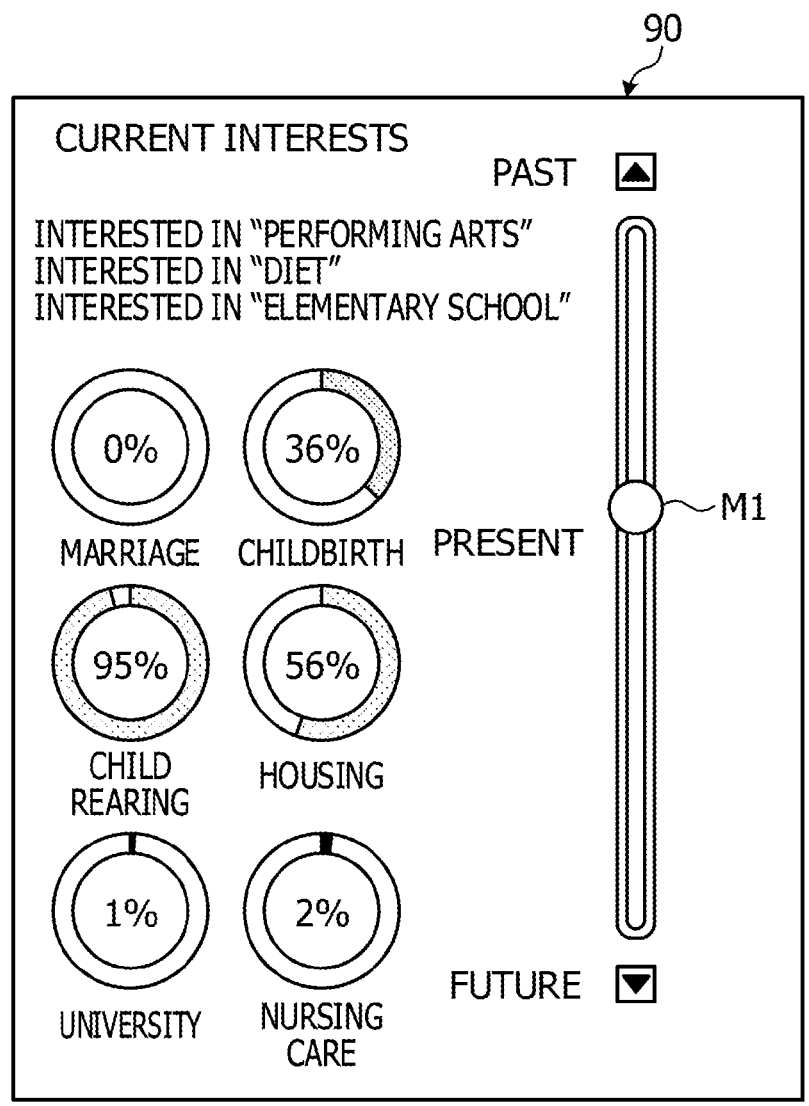
FIG. 11 is a diagram illustrating an example of a display screen that displays interest gages corresponding to the present.

In the foregoing first embodiment, description has been made of an example in which interest gages and keyword transitions are displayed on a display screen. However, there is no limitation to this. For example, the display control unit 52 may display only the interest gages on the display screen without displaying keyword transitions. FIG. 11 is a diagram illustrating an example of a display screen that displays interest gages corresponding to the present. As illustrated in FIG. 11, when the present is specified as a time, for example, interest gages corresponding to the present and main interest keywords (for example, "performing arts," "diet," and "elementary school") corresponding to the present are depicted on a display screen 90. In addition, a slide bar M1 indicating time is displayed on the display screen 90. Thus, the server device 12 may efficiently visualize estimated values with regard to the likelihood of occurrence of life events when transitions of keywords do not need to be displayed.

Example of Displaying Interest Gages of Life Events Exceeding Reference Value

Figure 12:
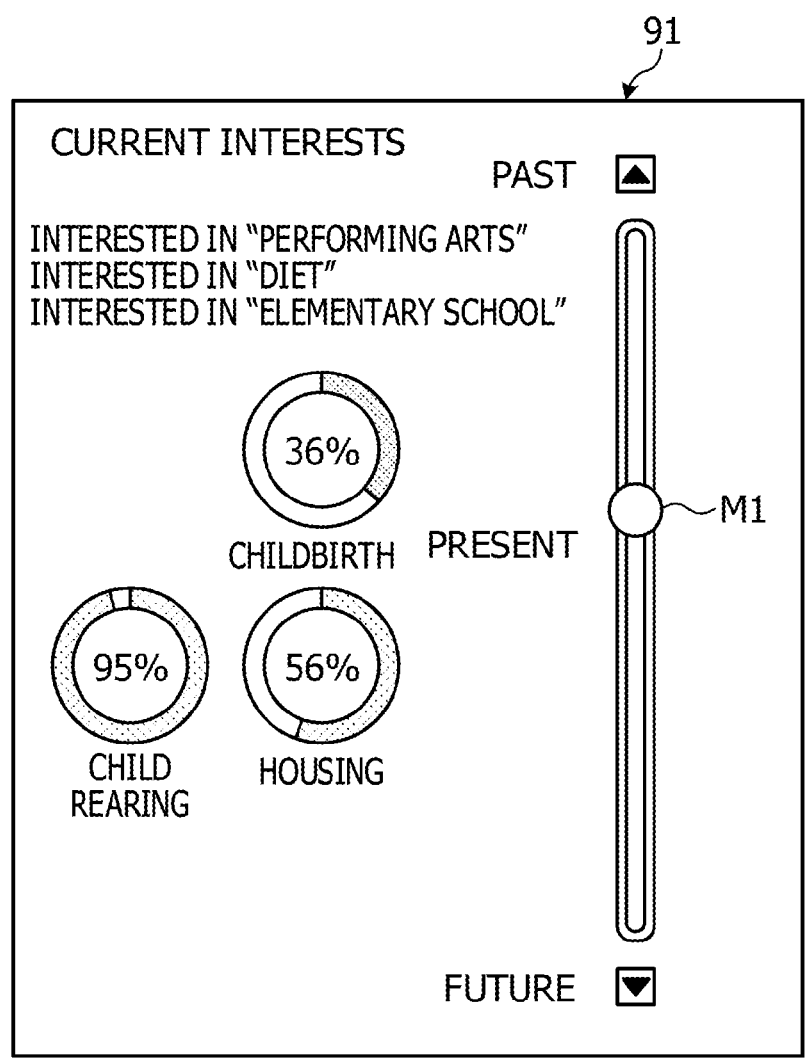
FIG. 12 is a diagram illustrating an example of a display screen that displays interest gages of life events exceeding a reference value.

In addition, in the foregoing first embodiment, description has been made of an example in which all of the interest gages of the respective life events for which the estimated values are calculated are displayed on the display screen. However, there is no limitation to this. For example, the display control unit 52 may display the interest gages of life events whose estimated values exceed a reference value on the display screen. FIG. 12 is a diagram illustrating an example of a display screen that displays the interest gages of life events exceeding a reference value. As illustrated in FIG. 12, for example, interest gages whose estimated values exceed the reference value and main interest keywords (for example, "performing arts," "diet," and "elementary school") are displayed on a display screen 91. In addition, a slide bar M1 indicating time is displayed on the display screen 91. In addition, the reference value may be 30%, for example. The example of the display screen 91 displays the interest gages of life events whose estimated values exceed 30%. The server device 12 may thereby emphasize important life events.

The server device 12 may thus selectively display life events whose estimated values calculated exceed the given reference. As a result, the server device 12 may emphasize important life events, and visualize estimated values with regard to the likelihood of occurrence of the life events.

Example of Displaying Only Interest Keywords as Keyword Transitions

Figure 13:
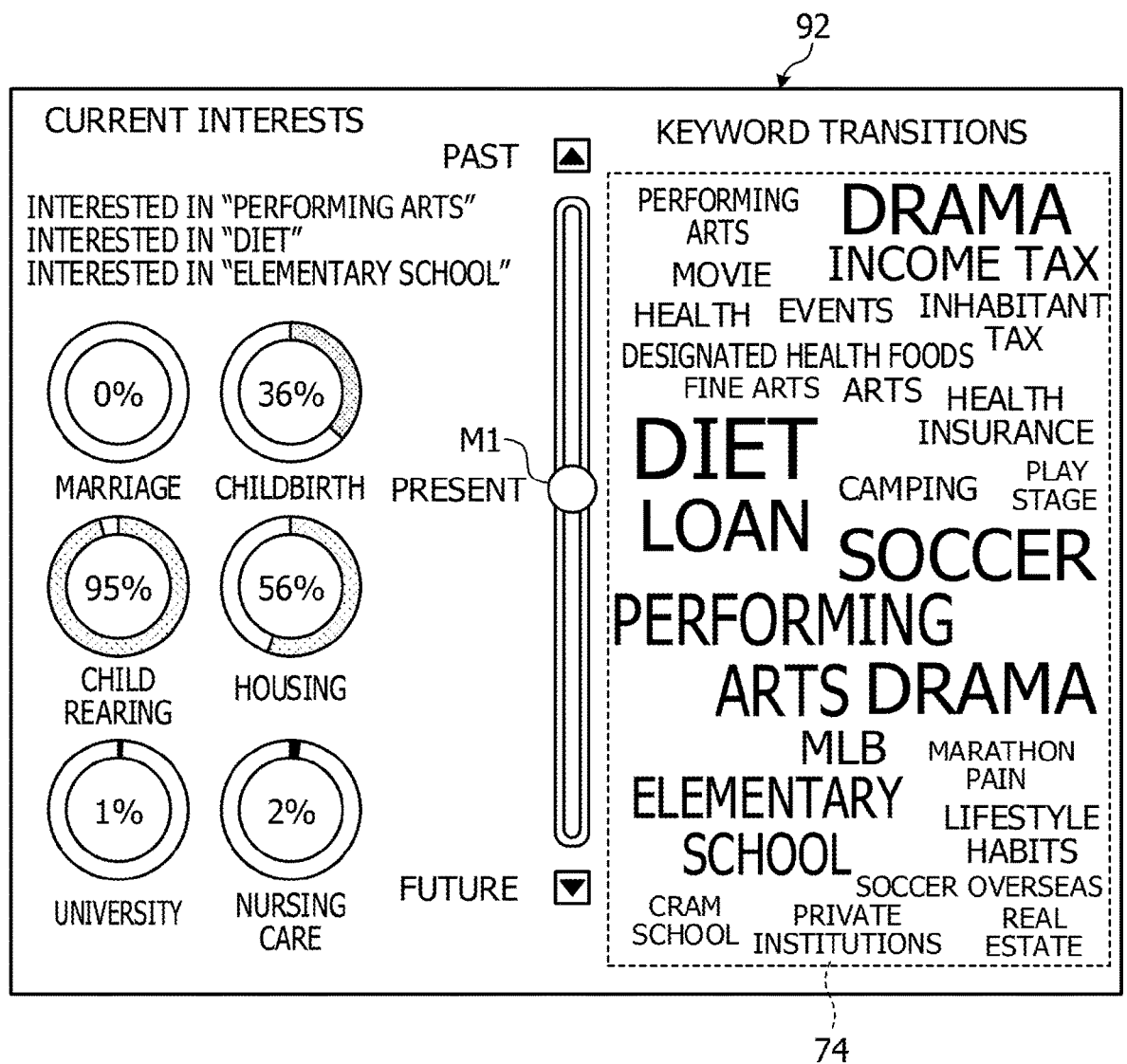
FIG. 13 is a diagram illustrating another example of a display screen that displays interest gages and keyword transitions.

In addition, in the foregoing first embodiment, description has been made of an example in which interest keywords and words extracted from the profile information are displayed as keyword transitions on the display screen. However, there is no limitation to this. For example, the display control unit 52 may display only interest keywords as keyword transitions on the display screen. FIG. 13 is a diagram illustrating another example of the display screen that displays interest gages and keyword transitions. As illustrated in FIG. 13, displayed on the display screen 92 are, for example, interest gages, main interest keywords, a slide bar M1, and keyword transitions of only interest keywords. The keyword transition region 74 does not display words extracted from the profile information, and displays only interest keywords. The server device 12 may thereby efficiently visualize estimated values with regard to the likelihood of occurrence of life events when the profile information does not particularly need to be displayed.

Example of Displaying Keyword Transitions of Customer and Keyword Transitions of User In addition, in the foregoing first embodiment, description has been made of an example in which keyword transitions of the customer are displayed as keyword transitions on the display screen. However, there is no limitation to this. For example, the registering unit 50 may refer to a user DB (not illustrated) included in the storage unit 21, similarly extract keywords from user information, and receive a registration of keywords (second word group) of the user which keywords are associated with time. Together with display of one or a plurality of life events, the display control unit 52 may display a display word group (third word group) of the customer which display word group corresponds to a specified time in the first word group. Further, the display control unit 52 may display a display word group (fourth word group) of the user which display word group corresponds to the specified time in the second word group.

Figure 14:
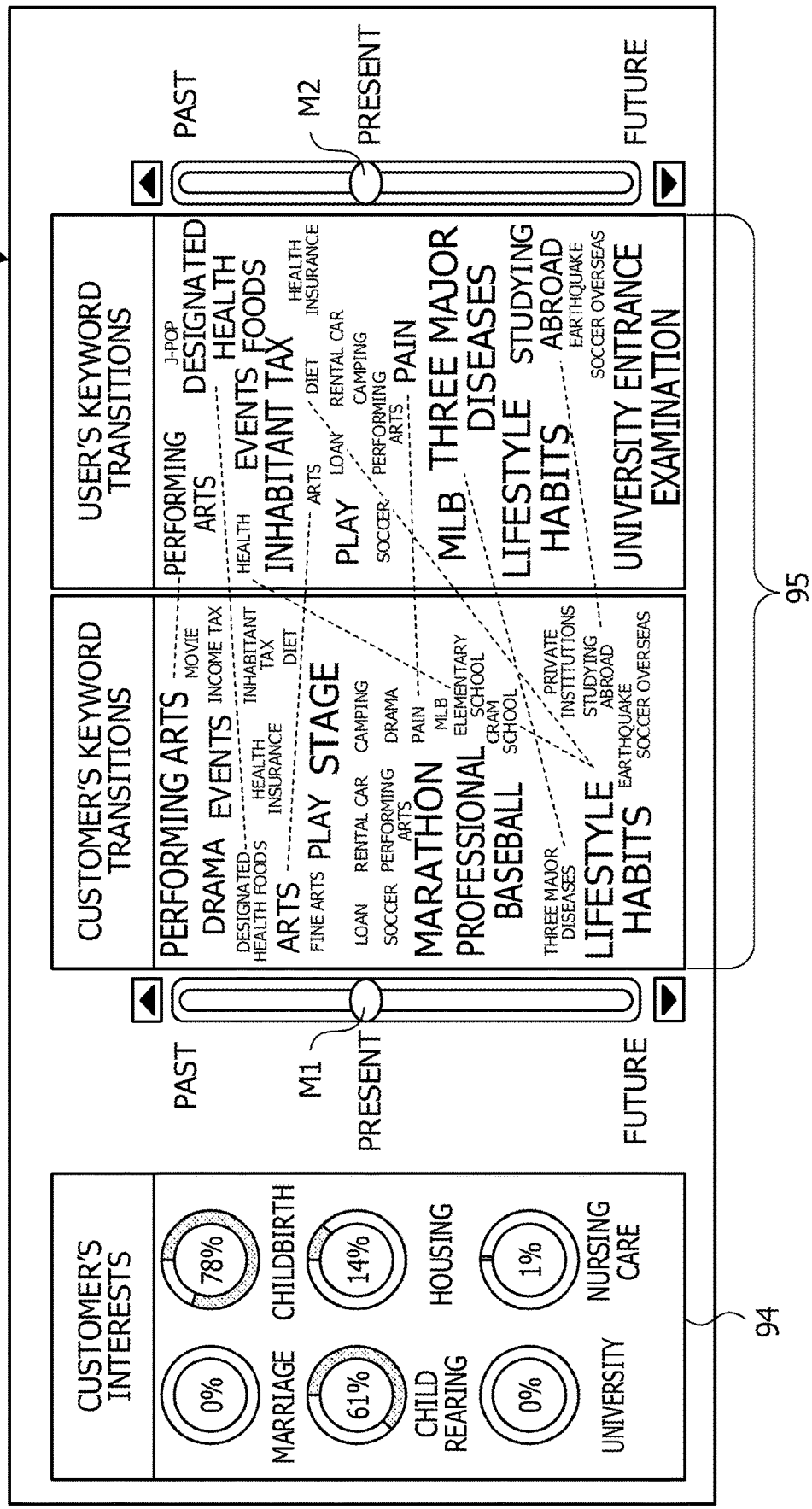
FIG. 14 is a diagram illustrating an example of a display screen of customer profile information.

Based on the above-described first to fourth word groups, the display control unit 52 may display keyword transitions of the customer and keyword transitions of the user himself/herself as keyword transitions on a display screen of customer profile information, for example. FIG. 14 is a diagram illustrating an example of a display screen of customer profile information. As illustrated in FIG. 14, displayed on a display screen 93 of customer profile information are a region 94 depicting interest gages corresponding to estimated values with regard to the likelihood of occurrence of life events of the customer and a region 95 depicting the keyword transitions of the customer and the keyword transitions of the user. In addition, slide bars M1 and M2 corresponding to the keyword transitions of the customer and the keyword transitions of the user, respectively, and indicating time are displayed in the vicinity of the keyword transitions of the customer and the keyword transitions of the user. Incidentally, the slide bars M1 and M2 may be moved independently of each other. When the position of the slide bar M1 indicates the present and the position of the slide bar M2 indicates the past, for example, the display control unit 52 displays, in the region 95, the keyword transitions of the customer which keyword transitions correspond to the present and the keyword transitions of the user which keyword transitions correspond to the past. The server device 12 may thereby visualize the keyword transitions of the customer and the keyword transitions of the user.

In addition, as illustrated in FIG. 14, when a word identical to a word included in the third word group or the fourth word group is included in the second word group or the first word group, the display control unit 52 may make display indicating a time direction in which the identical words are associated with each other. The display control unit 52 may display, for example, a connecting line connecting the identical words to each other as display indicating the time direction. The server device 12 may thereby visualize and display the identical words in such a manner as to be easily understood by the user.

Thus, the server device 12 may receive a registration of the second word group associated with time, and display the third word group corresponding to the specified time in the first word group and display the fourth word group corresponding to the specified time in the second word group together with display of one or a plurality of life events. As a result, the server device 12 may visualize estimated values with regard to the likelihood of occurrence of life events, and visualize the keyword transitions of the customer and the keyword transitions of the user.

In addition, when a word identical to a word included in the third word group or the fourth word group is included in the second word group or the first word group, the server device 12 may make display indicating a time direction in which the identical words are associated with each other. As a result, the server device 12 may visualize estimated values with regard to the likelihood of occurrence of life events, and visualize and display the identical words in such a manner as to be easily understood by the user.

Example of Using Template According to Attributes

In addition, in the foregoing first embodiment, description has been made of an example in which the calculating unit 51 calculates estimated values with regard to the likelihood of occurrence of life events irrespective of attributes of the customer. However, there is no limitation to this. For example, as for life events of given items selected according to the attributes of the customer, the calculating unit 51 may calculate estimated values with regard to the likelihood of occurrence of life events for each given item. For example, the storage unit 21 stores given templates including appropriate life event items for different ages such as twenties, thirties, and forties and different genders such as a male and a female. The calculating unit 51 selects a corresponding template from the given templates stored in the storage unit 21 according to the attributes of the customer. For life events of given items included in the selected template, the calculating unit 51 calculates estimated values with regard to the likelihood of occurrence of life events for each given item. The server device 12 may thereby select life events according to the attributes of the customer.

Thus, for life events of given items selected according to the attributes of the user, the server device 12 may calculate estimated values with regard to the likelihood of occurrence of life events for each given item. As a result, the server device 12 may select life events according to the attributes of the customer, and visualize estimated values with regard to the likelihood of occurrence of the life events.

Other Application Examples

In addition, various application examples may be cited other than the above. For example, the server device 12 may have an alarm function, and when there is a customer whose life event exceeds a given value, the server device 12 may give an alarm to the user terminal 11 used by a user in charge of the customer.

In addition, the server device 12 may have a topic providing function, for example, and when a life event button displayed on the display screen is depressed, the server device 12 may transmit corresponding contents to the user terminal 11 to display the corresponding contents.

In addition, the server device 12 may have a visiting route selecting function, for example, and the server device 12 may present, to the user, an optimum visiting route selected so as to preferentially include customers having high estimated values with regard to the likelihood of occurrence of life events in the visiting route.

Display Program

Figure 15:
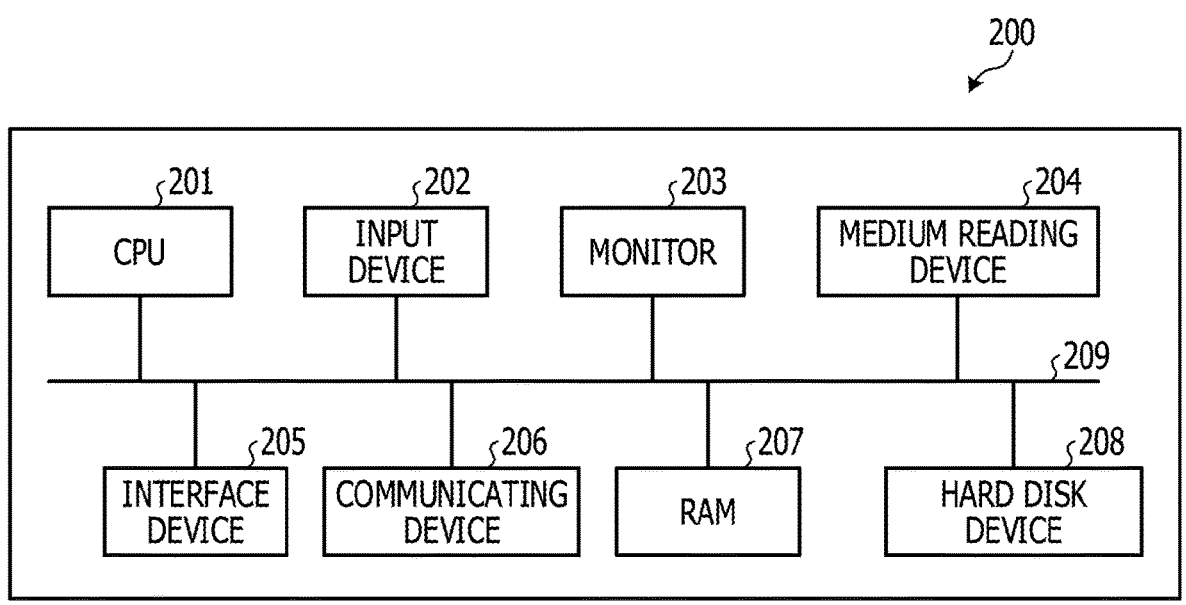
FIG. 15 is a diagram illustrating an example of a computer that executes an estimating program.

In addition, the various kinds of processing described in each of the foregoing embodiments may also be implemented by executing a program prepared in advance in a computer system such as a personal computer or a workstation. Accordingly, the following description will be made of an example of a computer system that executes a program having functions similar to those of each of the foregoing embodiments. FIG. 15 is a diagram illustrating an example of a computer that executes an estimating program.

As illustrated in FIG. 15, the computer 200 includes a CPU 201 that executes various kinds of arithmetic processing, an input device 202 that receives data input, and a monitor 203. In addition, the computer 200 includes a medium reading device 204 that reads a program or the like from a storage medium, an interface device 205 for coupling to various kinds of devices, and a communicating device 206 for coupling to another information processing device or the like by wire or radio. In addition, the computer 200 includes a RAM 207 that temporarily stores various kinds of information, and a hard disk device 208. In addition, each of the devices 201 to 208 is coupled to a bus 209.

The hard disk device 208 stores the estimating program that has functions similar to those of the respective processing units of the registering unit 50, the calculating unit 51, and the display control unit 52 illustrated in FIG. 2. The hard disk device 208 also stores various kinds of data for implementing the customer information DB 30, the trend information DB 31, and the estimating program. The input device 202, for example, receives input of various kinds of information such as operating information from an administrator of the computer 200. The monitor 203, for example, displays various kinds of screens such as a display screen for the administrator of the computer 200. A printing device, for example, is coupled to the interface device 205. The communicating device 206, for example, has functions similar to those of the communicating unit 20 illustrated in FIG. 2 and is coupled to the network N to exchange various kinds of information with the user terminal 11.

The CPU 201 performs various kinds of processing by reading programs stored in the hard disk device 208, expanding the programs in the RAM 207, and executing the programs. In addition, these programs may make the computer 200 to function as the registering unit 50, the calculating unit 51, and the display control unit 52 illustrated in FIG. 2.

It is to be noted that the above-described estimating program does not necessarily need to be stored in the hard disk device 208. For example, the computer 200 may read and execute the program stored on a storage medium readable by the computer 200. A portable recording medium such as a compact disc read only memory (CD-ROM), a digital versatile disc (DVD), or a universal serial bus (USB) memory, a semiconductor memory such as a flash memory, a hard disk drive, for example, corresponds to the storage medium readable by the computer 200. In addition, this estimating program may be stored in devices coupled to a public circuit, the Internet, a LAN, or the like, and the computer 200 may read the estimating program from these devices and execute the estimating program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method, performed by a computer, for event estimation, the method comprising:
executing a registering process that includes
receiving a registration of a first word group with respect to a customer, the first word group including a plurality of words, each of the plurality of words being associated with time and indicating a topic in which the customer is interested, and
storing, in association with the customer, the first word group into a memory;
executing a calculating process that includes
receiving a first input through a graphical user interface in a display screen of a display device, the first input indicating a time point from among a plurality of time points on a time axis, the first input being input by a user other than the customer,
obtaining, among the plurality of words in the first word group, a first word associated with a time belonging to a predetermined range from the time point indicated by the first input, and
calculating, for each of a plurality of life events with respect to the customer, an index value with respect to the customer indicating likelihood of occurrence of the respective life event with respect to the customer, by using the obtained first word; and
executing a display process that includes
controlling, for each of the plurality of life events with respect to the customer, display of the respective life event based on the index value calculated for the respective life event with respect to the customer,
the calculating of the index value being configured to
calculate, for each of the plurality of life events with respect to the customer, the index value for the respective life event in accordance with a difference between a current age of the customer and an average age associated with the respective life event, in a manner such that greater the difference, smaller the index value,
obtain, for each of the plurality of life events with respect to the customer, a comparison result by comparing the obtained first word with a predetermined word associated with the respective life event, and
in response to the comparison result indicating that the obtained first word matches with the predetermined word associated with the respective life event, adjust the calculated index value for the respective life event to increase,
the controlling of the display being configured to
control, for each of the plurality of life events with respect to the customer, the display of the respective life event by using the adjusted index value for the respective life event.

2. The method according to claim 1, wherein
the display process includes displaying the adjusted index value in association with the life event with respect to the customer.

3. The method according to claim 1, wherein
the display process includes selectively displaying the life event with respect to the customer when the adjusted index value corresponding to the life event exceeds a threshold.

4. The method according to claim 1, wherein
the display process includes displaying the first word together with the display of the life event with respect to the customer.

5. The method according to claim 1, wherein
the first word includes a second plurality of words, each of the second plurality of words being associated with a time in the vicinity of the time point indicated by the first time pointer,
the display process includes displaying a part of or all of the plurality of words included in the first word, together with the display of the life event with respect to the customer.

6. The method according to claim 1, wherein
the registering process includes
receiving a registration of a second word group with respect to the user, the second word group including a second plurality of words, each of the second plurality of words being associated with time, and
storing, in association with the user, the second word group into the memory, and
the display process includes
displaying a third word group obtained from the first word group, the third word group including one or more of words associated with a time corresponding to the time point indicated by the first time pointer, and
displaying a fourth word group obtained from the second word group, the fourth word group including one or more of words associated with a time corresponding to the time point indicated by the first time pointer.

7. The method according to claim 6, wherein
the display process includes displaying, in a case where there is a common word between the third word group and the fourth word group, an indication regarding the common word included in both of the third word group and the fourth word group.

8. The method according to claim 1, wherein
the calculating process includes, for life events of given items selected according to attributes of the customer, calculating the estimated value for each given item.

9. An estimating device comprising:
a memory; and
a processor coupled to the memory and configured to:
execute a registering process that includes
receiving a registration of a first word group with respect to a customer, the first word group including a plurality of words, each of the plurality of words being associated with time and indicating a topic in which the customer is interested, and
storing, in association with the customer, the first word group into a memory;
execute a calculating process that includes
receiving a first input through a graphical user interface in a display screen of a display device, the first input indicating a time point from among a plurality of time points on a time axis, the first input being input by a user other than the customer,
obtaining, among the plurality of words in the first word group, a first word associated with a time belonging to a predetermined range from the time point indicated by the first input, and
calculating, for each of a plurality of life events with respect to the customer, an index value with respect to the customer indicating likelihood of occurrence of the respective life event with respect to the customer, by using the obtained first word; and
execute a display process that includes
controlling, for each of the plurality of life events with respect to the customer, display of the respective life event based on the index value calculated for the respective life event with respect to the customer, the calculating of the index value being configured to calculate, for each of the plurality of life events with respect to the customer, the index value for the respective life event in accordance with a difference between a current age of the customer and an average age associated with the respective life event, in a manner such that greater the difference, smaller the index value, obtain, for each of the plurality of life events with respect to the customer, a comparison result by comparing the obtained first word with a predetermined word associated with the respective life event, and in response to the comparison result indicating that the obtained first word matches with the predetermined word associated with the respective life event, adjust the calculated index value for the respective life event to increase, the controlling of the display being configured to control, for each of the plurality of life events with respect to the customer, the display of the respective life event by using the adjusted index value for the respective life event.

10. A non-transitory computer-readable storage medium for storing a program regarding event estimation, the program causing a processor to execute a process, the process comprising:

executing a registering process that includes receiving a registration of a first word group with respect to a customer, the first word group including a plurality of words, each of the plurality of words being associated with time and indicating a topic in which the customer is interested, and storing, in association with the customer, the first word group into a memory;

executing a calculating process that includes receiving a first input through a graphical user interface in a display screen of a display device, the first input indicating a time point from among a plurality of time points on a time axis, the first input being input by a user other than the customer, obtaining, among the plurality of words in the first word group, a first word associated with a time belonging to a predetermined range from the time point indicated by the first input, and calculating, for each of a plurality of life events with respect to the customer, an index value with respect to the customer indicating likelihood of occurrence of the respective life event with respect to the customer, by using the obtained first word; and executing a display process that includes controlling, for each of the plurality of life events with respect to the customer, display of the respective life event based on the index value calculated for the respective life event with respect to the customer, the calculating of the index value being configured to calculate, for each of the plurality of life events with respect to the customer, the index value for the respective life event in accordance with a difference between a current age of the customer and an average age associated with the respective life event, in a manner such that greater the difference, smaller the index value, obtain, for each of the plurality of life events with respect to the customer, a comparison result by comparing the obtained first word with a predetermined word associated with the respective life event, and in response to the comparison result indicating that the obtained first word matches with the predetermined word associated with the respective life event, adjust the calculated index value for the respective life event to increase, the controlling of the display being configured to control, for each of the plurality of life events with respect to the customer, the display of the respective life event by using the adjusted index value for the respective life event.

* * * * *